(12) United States Patent
Shrall et al.

(10) Patent No.: US 9,086,834 B2
(45) Date of Patent: *Jul. 21, 2015

(54) CONTROLLING CONFIGURABLE PEAK PERFORMANCE LIMITS OF A PROCESSOR

(71) Applicant: Intel Corporation, Santa Clara, CA (US)

(72) Inventors: Jeremy J. Shrall, Portland, OR (US); Stephen H. Gunther, Beaverton, OR (US); Krishnakanth V. Sistla, Beaverton, OR (US); Ryan D. Wells, Folsom, CA (US); Shaun M. Conrad, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,247

(22) Filed: Mar. 5, 2013

(65) Prior Publication Data

US 2014/0176581 A1 Jun. 26, 2014

Related U.S. Application Data

(63) Continuation of application No. 13/724,732, filed on Dec. 21, 2012.

(51) Int. Cl.
*G06F 1/26* (2006.01)
*G06F 3/14* (2006.01)
*G06F 1/32* (2006.01)

(52) U.S. Cl.
CPC ............... *G06F 3/14* (2013.01); *G06F 1/3243* (2013.01); *Y02B 60/1239* (2013.01)

(58) Field of Classification Search
USPC .............................. 345/502, 503, 505; 712/34
See application file for complete search history.

(56) References Cited

U.S. PATENT DOCUMENTS

| 5,163,153 | A | 11/1992 | Cole et al. |
| 5,522,087 | A | 5/1996 | Hsiang |

(Continued)

FOREIGN PATENT DOCUMENTS

EP      1 282 030 A1     5/2003

OTHER PUBLICATIONS

International Searching Authority, "Notification of Transmittal of the International Search Report and the Written Opinion of the International Searching Authority," mailed Nov. 1, 2013, in International application No. PCT/US2013/048455.

(Continued)

*Primary Examiner* — David Zarka
*Assistant Examiner* — Richard M Russell
(74) *Attorney, Agent, or Firm* — Trop, Pruner & Hu, P.C.

(57) ABSTRACT

In one embodiment, the present invention includes a processor having a plurality of cores each to execute instructions, a non-volatile storage to store maximum peak operating frequency values each a function of a given number of active cores, a configuration storage to store frequency limits each corresponding to one of the maximum peak operating frequency values or a configurable clip frequency value less than the maximum peak operating frequency value. In turn, a power controller is configured to limit operating frequency of the cores to a corresponding frequency limit obtained from the configuration storage. Other embodiments are described and claimed.

17 Claims, 6 Drawing Sheets

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,931,950 A | 8/1999 | Hsu | |
| 6,262,872 B1* | 7/2001 | Messerli et al. | 361/93.2 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,594,128 B2* | 9/2009 | Bacchus et al. | 713/300 |
| 7,730,340 B2* | 6/2010 | Hu et al. | 713/323 |
| 7,818,596 B2* | 10/2010 | Fenger et al. | 713/322 |
| 8,127,160 B2* | 2/2012 | Bieswanger et al. | 713/321 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2006/0282692 A1 | 12/2006 | Oh | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0198864 A1* | 8/2007 | Takase | 713/300 |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0122109 A1* | 5/2010 | Rambo et al. | 713/600 |
| 2010/0146513 A1 | 6/2010 | Song | |
| 2010/0191997 A1 | 7/2010 | Dodeja et al. | |
| 2011/0099397 A1* | 4/2011 | Rotem et al. | 713/320 |
| 2011/0154090 A1 | 6/2011 | Dixon et al. | |
| 2012/0079290 A1 | 3/2012 | Kumar | |
| 2012/0173895 A1 | 7/2012 | Kim et al. | |
| 2012/0185706 A1 | 7/2012 | Sistla et al. | |
| 2012/0216058 A1 | 8/2012 | Wells et al. | |
| 2012/0246506 A1 | 9/2012 | Knight | |
| 2012/0254643 A1 | 10/2012 | Fetzer | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0205126 A1* | 8/2013 | Kruglick | 713/1 |
| 2014/0149755 A1* | 5/2014 | Brock et al. | 713/300 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays In A GALS Processor Microarchitecture," 2004, pp. 1-13.

Joan-Manuel Parcerisa, et al., "Efficient nterconnects for Clustered Microarchitectures," 2002, pp. 1-10. Ill.

Grigorios Magklis, et al., "Profile-Based Dynamic Voltage and Frequency Stalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach To Linear Filtering and Prediction Problems," 1960, pp. 1-12.

International Application No. PCT/US2012/028865, filed Mar. 13, 2012, entitled "Providing Efficient Turbo Operation Of A Processor," by Intel Corporation.

International Application No. PCT/US2012/028902, filed Mar. 13, 2012, entitled "Dynamically Controlling Interconnect Frequency In A Processor," by Intel Corporation.

International Application No. PCT/US2012/028876, filed Mar. 13, 2012, entitled "Dynamically Computing An Electrical Design Point (EDP) For A Multicore Processor," by Intel Corporation.

U.S. Appl. No. 13/600,568, Filed Aug. 31, 2012, entitled, "Configuring Power Management Functionality In A Processor," by Malini K. Bhandaru, et al.

\* cited by examiner

CONTROLLING CONFIGURABLE PEAK PERFORMANCE LIMITS OF A PROCESSOR

This application is a continuation of U.S. patent application Ser. No. 13/724,732, filed Dec. 21, 2012, the content of which is hereby incorporated by reference.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In some software applications, individual processor performance variability across nodes of a compute cluster can result in software failures. At the same time, the nature of modern processors is to take advantage of environmental capacity such as power or thermal constraints and increase processor clock frequency until one or more of these limits are reached. With die-to-die silicon variation, processor operation is generally non-deterministic. The solution for many users who seek to normalize performance across nodes is to disable altogether opportunistic turbo mode operation in which clock frequencies of a processor are increased. While this can more readily ensure determinism of operation across the nodes, a significant amount of performance is lost.

DETAILED DESCRIPTION

In various embodiments, peak performance levels of a processor can be controlled in a manner to achieve some turbo mode performance upside without the variability typically associated with it. In general, processor turbo mode operation is implemented with control algorithms that maximize performance below a package level power budget such that when budget is available, one or more domains of a processor can operate at a frequency greater than a guaranteed maximum frequency. Embodiments may be particularly applicable in two scenarios: maximizing processor core frequency when applications execute at generally low power levels; and maximizing processor core frequency when applications execute with low core utilization (e.g., 4 of 8 cores of a multicore processor are active).

In high volume manufacturing, most processors are capable of running at peak frequencies (namely, a maximum peak frequency for the particular silicon-based processor) that can easily exceed platform power delivery constraints when certain applications are running. This naturally creates a non-determinism of software execution time. However, when processor applications are running at lower core utilization, it is theoretically possible to run them at higher clock frequencies and still ensure determinism since the maximum possible power consumption of the processor package is still below voltage regulator, power supply and wall power delivery constraints. Embodiments thus provide techniques to limit opportunistic processor operation to levels below any of these constraints.

Figure 1:
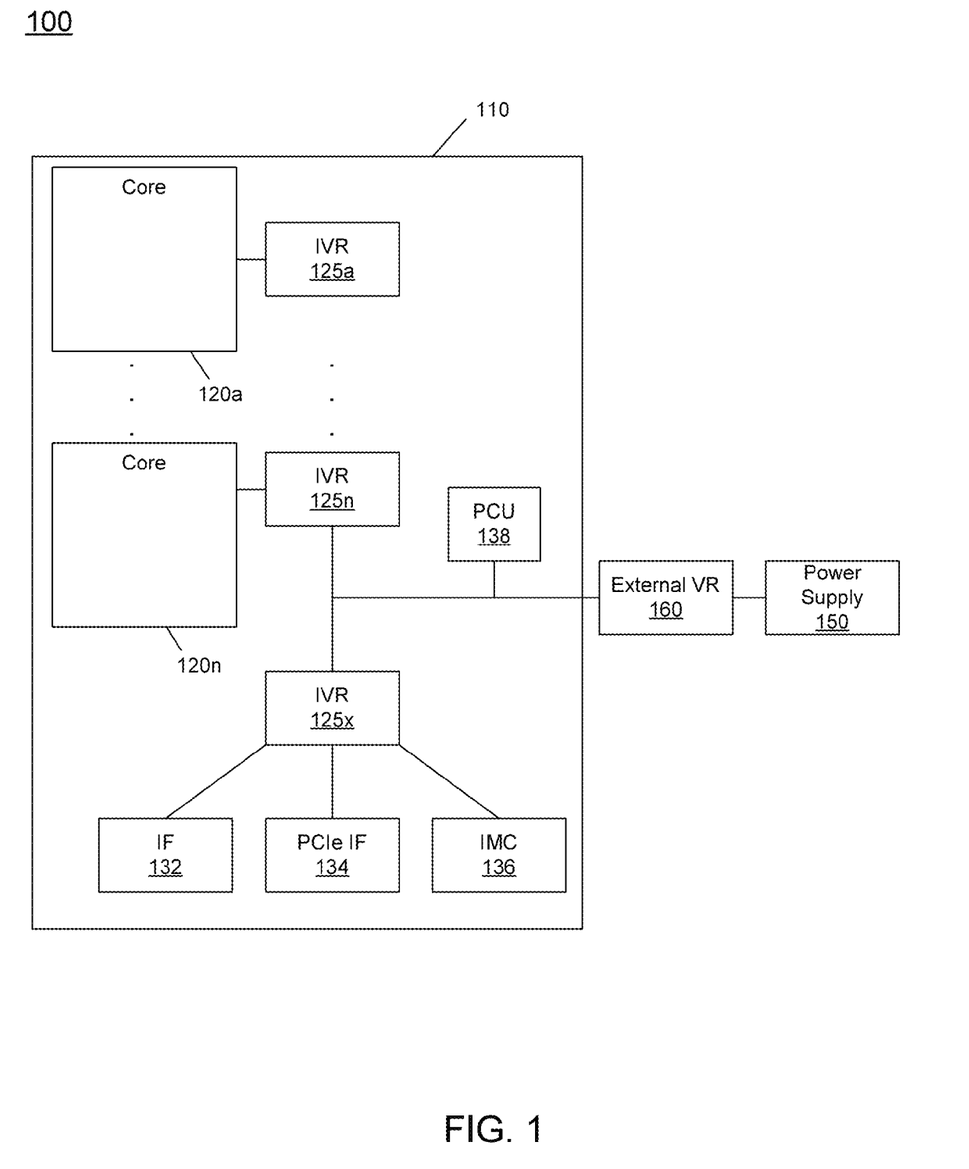
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple cores 120a-120n. In addition, each core may be associated with an individual voltage regulator 125a-125n to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to limit processor frequency and/or other operating parameter below a supported level to a dynamically configurable limit in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

While not shown for ease of illustration, understand that additional components may be present within processor 110 such as additional uncore logic and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the configurable frequency and/or other operating parameter control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Embodiments provide an interface for an entity such as a software entity to control processor peak frequency level as a function of the number of active cores. By default, a processor is configured to operate with active cores operating at frequencies up to the maximum frequency capability of the silicon, where this maximum peak frequency is configured into the processor as one or more fused values (such as a given maximum peak frequency for a given number of active cores). Typically, this maximum peak frequency corresponds to that available in a highest turbo mode when a processor is requested to operate at an ACPI P0 state. Note that this maximum frequency is thus higher than a guaranteed maximum frequency (such as an ACPI P1 state). Using an embodiment of the present invention, the maximum peak frequency available to frequency control algorithms may be reduced or clipped by causing lower per-core turbo frequency constraints to be used by these algorithms. In an embodiment, an interface may be provided to enable software such as basic input/output system (BIOS) configuration code to set these clip values, also referred to herein as a clip or constraint frequency. Although the particular example described herein is with regard to core domain control via core frequency control, understand that similar techniques can be used to control other domains of a processor such as a graphics domain, interconnect domain, uncore domain and so forth.

Configurable per-core frequency limits may be provided that can be updated as a function of the type of workload being executed, assuming that a user has a priori knowledge of characteristics of the workload. Thus for some applications, a customer may configure these values based on a priori knowledge of the application. In an embodiment, these maximum turbo frequency constraints (which are a set of constraints of typically lower values than the processor-configured fused values for maximum peak frequency) may be configured dynamically at run-time.

This control interface can be used to cover all workloads generically and it may also be used to automatically calibrate peak performance levels, assuming a user can predict the type of workloads it will run a priori. To execute this calibration, software may run a workload suite and sweep the turbo frequency constraints to determine a failure surface. Users may speed up the search process by employing a feature that signals interrupts upon detection of a power or thermal constraint. In such cases, upon a single excursion above power or thermal limits, a user may dial back the peak per-core frequency constraints until the software executes without an excursion.

Figure 2:
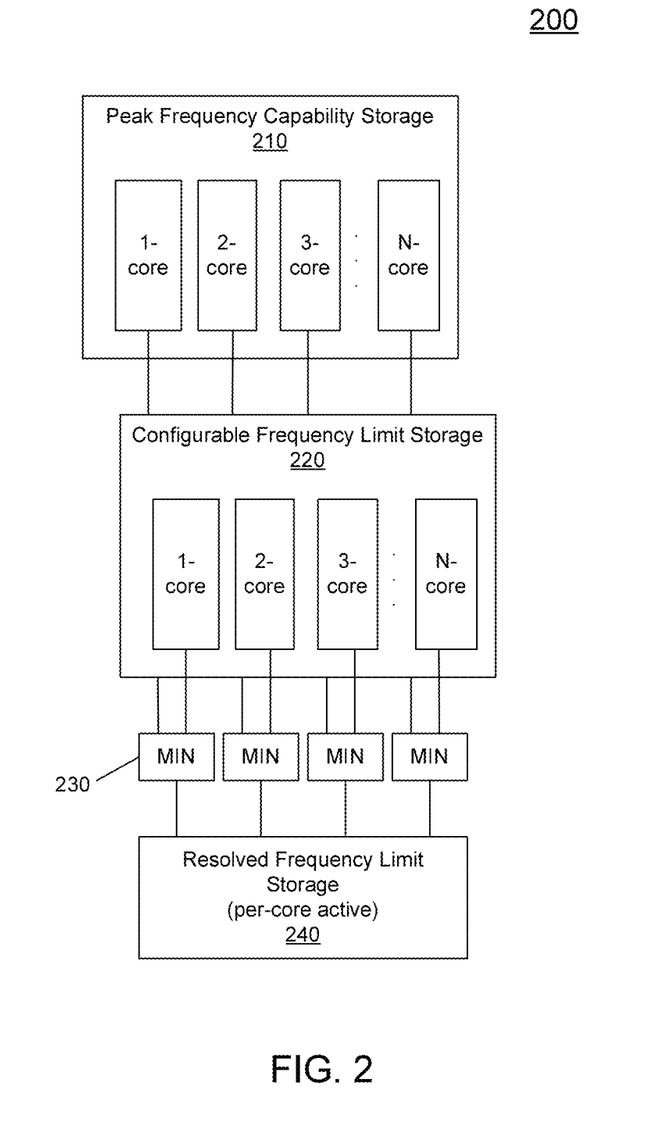
FIG. 2 is a block diagram illustrating a configurable peak performance limit control mechanism in accordance with an embodiment of the present invention.

Referring now to FIG. 2, shown is a block diagram illustrating a configurable peak performance limit control mechanism in accordance with an embodiment of the present invention. As shown in FIG. 2, logic 200 may be part of a processor, and more particularly may be present in a logic of a PCU. In general, logic 200 operates to determine a maximum operating frequency at which cores of the processor can operate, and to limit this maximum frequency below manufacture-time fused values for the processor. Thus as seen in FIG. 2, a processor includes a peak frequency capability storage 210. In an embodiment, this storage may store peak capability information corresponding to a maximum operating frequency that is a function of and/or otherwise dependent on a given number of active cores of a multicore processor. In the example shown, for an N-core processor, N values are provided where each value corresponds to a maximum operating frequency possible for the particular silicon-based processor when the given number of cores is active. The capability information stored in storage 210 in an embodiment may be obtained from fuses or other non-volatile storage of the processor as written or fused during manufacture of the semiconductor die.

To effect configurable user-controlled values below these capability or maximum peak frequency values, a set of configurable frequency limit values may be stored in a storage 220. In an embodiment, there may be N configurable values, with each corresponding to a configurable clip or constraint frequency, as a function of the number of active cores. Note that for the sets of frequencies present in both storage 210 and storage 220, typically with a fewer number of active cores a higher operating frequency is possible. Thus when only one core is active, the operating frequency can be higher than when N cores are active. In an embodiment, these constraint frequency limits may be obtained in various manners, including as configuration values written during BIOS initialization, user-controlled values, e.g., based on a priori knowledge of a workload to be executed on the processor, or so forth. In general, these configurable limit values may be set to levels below the fused values.

As seen, logic 200 includes a min operator 230 to perform a min operation between each of these configurable constraint frequency limits and a corresponding peak frequency capability value such that the lesser of each of the two values for the corresponding given number of active cores can be stored in a corresponding field of a configuration storage 240, also referred to herein as a resolved frequency limit storage. As one example, this configuration storage may be a configuration register available to the PCU that stores a turbo ratio limit value, also referred to herein as a resolved frequency limit, for each possible number of active cores.

Referring now to Table 1, shown is an example configuration register arrangement to store a set of resolved frequency limits in accordance with an embodiment of the present invention. As seen, each field of this register may store a resolved value of the set of such values.

TABLE 1

| MSB | LSB | Field Name | Description |
|---|---|---|---|
| 7 | 0 | 1-core Frequency Limit | Controls the maximum clock frequency when one core is active |
| 15 | 8 | 2-core Frequency Limit | Controls the maximum clock frequency when two cores are active |
| 23 | 16 | 3-core Frequency Limit | Controls the maximum clock frequency when three cores are active |
| ... | ... | ... | Etc., scaling up to the maximum available core count of this processor |

During operation, e.g., of a control loop of the PCU, and based on the current number of active cores, a given one of these values stored in configuration storage 240 may be selected as the resolved frequency limit to be the maximum turbo mode frequency at which active cores can operate. Note that due to the configurable frequency limits, this maximum turbo mode frequency is likely to be lower than a maximum peak frequency according to the information stored in capability storage 210. For example, while for N active cores, storage 210 may store a maximum peak frequency of 3.0 gigahertz (GHz) (as an example), instead configuration storage 240 may store a resolved frequency limit for N active cores of 2.5 GHz or another frequency less than the maximum peak frequency. Of course different frequencies are possible in different implementations.

Assume that three cores of the multicore processor are active. In this case, a min of the value stored in storage 220 corresponding to the 3-active core frequency limit and the programmed frequency limit in capability storage 210 is determined, stored in configuration storage 240, and used in PCU control operations to thus limit or clip operating frequency of these active cores to this min value. Assume next that a core, system software or other entity requests a performance state that is associated with a higher operating frequency (such as a P0 state). In this case, the PCU does not allow this requested frequency and instead limits performance to that possible using the resolved value stored in configuration storage 240 for the active number of cores.

Although shown at this high level in the embodiment of FIG. 2, understand that the scope of the present invention is not limited in this regard. For example, instead of frequency a different configurable parameter of a processor may be controlled such that a minimum of a maximum peak operating parameter value that is a function of an activity level of the processor (or one or more domains) and a configurable clip parameter value can be selected and used to limit an operating parameter of the processor. As examples in addition to frequency, such configurable parameters may include instruction execution rate, retirement rate or other parameter to maximize performance within a configurable value that does not reach a power limit of the processor.

Furthermore understand that the representation shown in FIG. 2 is a logical view. That is, in some embodiments rather than providing for these three different storages and a min operator only a single configuration storage is present and during BIOS execution, the silicon-configured values may be updated to lower values, namely the BIOS or user set configurable constraint frequency limits that thus overwrite the fused values obtained from a non-volatile storage.

Figure 3:
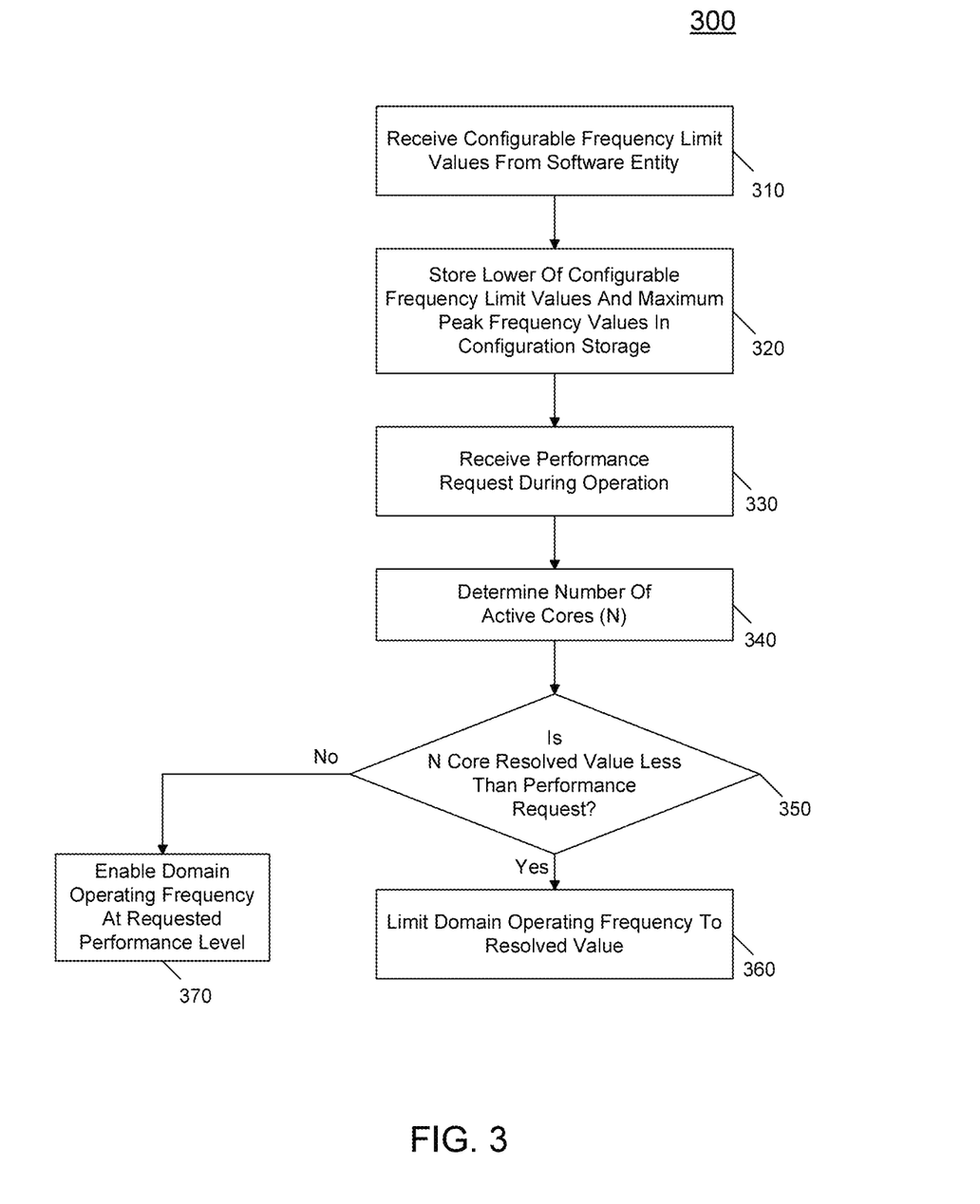
FIG. 3 is a flow diagram of a method for dynamically limiting processor frequency in accordance with an embodiment of the present invention.

Referring now to FIG. 3, shown is a flow diagram of a method for dynamically limiting processor frequency in accordance with an embodiment of the present invention. As shown in FIG. 3, method 300 may be performed within logic of a PCU, such as frequency limit control logic. However, understand that in other embodiments this logic can be implemented as a standalone logic or as part of another portion of a processor. As seen, method 300 begins by receiving configurable frequency limit values from a software entity (block 310). For example, upon processor initialization the logic can receive these values from BIOS. Or these values can be dynamically received during processor runtime, e.g., prior to execution of a particular application for which a priori knowledge of its workload is available. In an embodiment, a configurable frequency limit value may be provided for each possible combination of active cores. For a processor with N cores, N such values may be provided. Typically many or all of these values may be constraint values such that they are lower than a maximum peak frequency fused into the processor.

Still referring to FIG. 3, control passes to block 320 where a lower of one of these configurable frequency limit values and the corresponding maximum peak frequency value can be stored into each field of a configuration storage. As an example, this configuration storage may initially store the maximum peak frequency values obtained from a non-volatile storage of the processor. Thus this operation at block 320 may act to overwrite these maximum peak frequency values with the configurable frequency limit values. In other implementations a min operation is performed to obtain these resolved values and store them in the configuration storage. Thus at this point the configuration storage is ready to be accessed during normal operation.

Still referring to FIG. 3 the remaining operations relate to a normal processor operation in which an entity such as OS, driver or so forth issues a request for a thread to execute on a given core with a particular performance level that in turn is associated with a given core frequency of operation.

As part of handling that request, the logic can determine a number of active cores in the processor (block 340). Then it can be determined at diamond 350 whether the N-core resolved value is less than the value for the performance request, namely the operating frequency associated with this request. Note that this performance request value may be directly received from the entity, or it can be obtained via access to a lookup table based on the performance request. If the determination of diamond 350 is in the affirmative, the given domain operating frequency (e.g., the particular core or more globally the entire core domain) can be limited to this resolved frequency value (block 360). This limited frequency may still provide for turbo mode operation for the processor at a level such that power and/or thermal constraints are not reached, enabling deterministic operation of an application or other workload. As such, multiple independent systems of a compute cluster can each execute the same application in a deterministic manner.

Still referring to FIG. 3, otherwise if the corresponding resolved value is not less than the performance request, control passes to block 370 where the domain operating frequency can be enabled at the requested performance level. Although shown at this high level in the embodiment of FIG. 3, understand the scope of the present invention is not limited in this regard.

Figure 4:
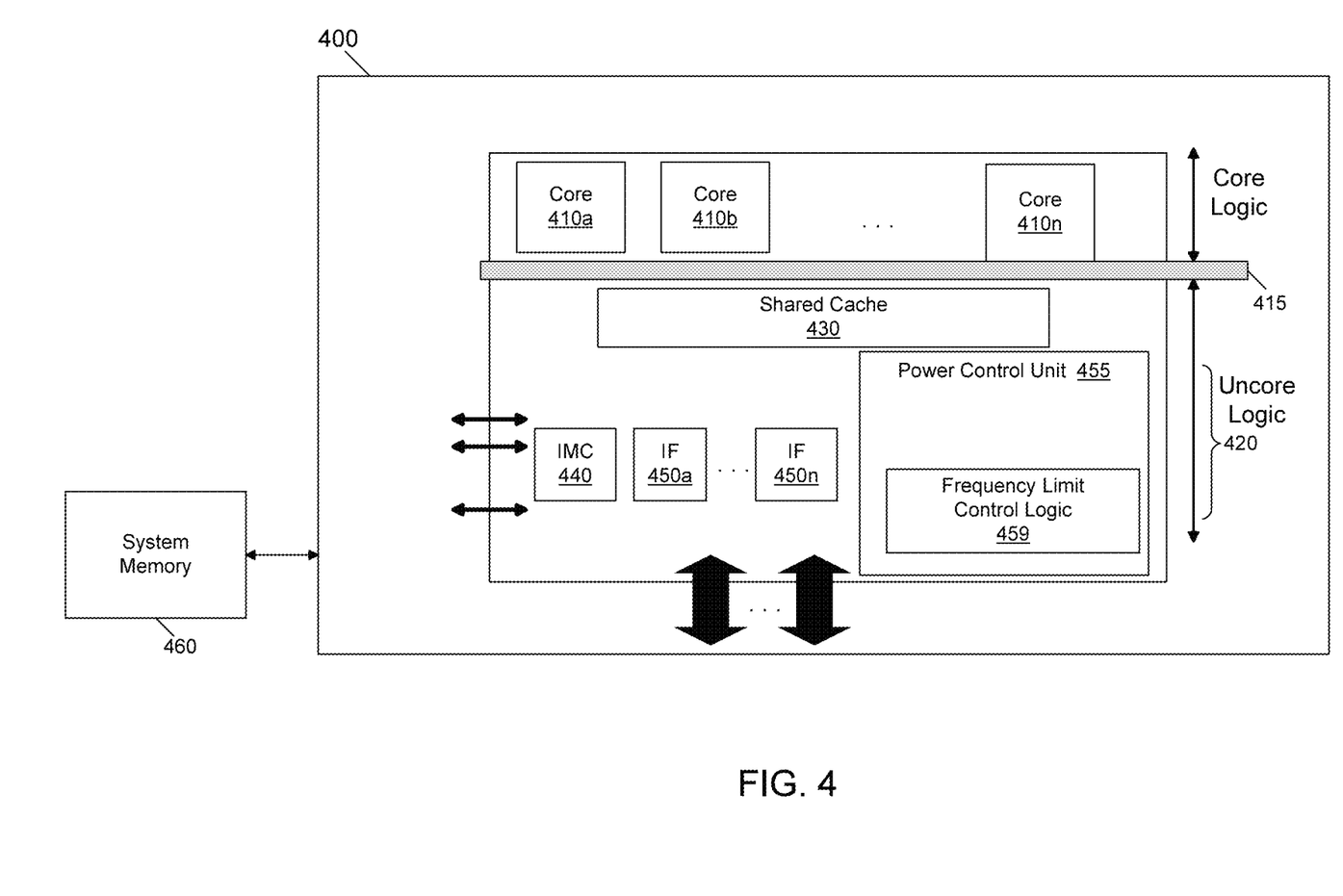
FIG. 4 is a block diagram of a processor in accordance with an embodiment of the present invention.

Embodiments can be implemented in processors for various markets including server processors, desktop processors, mobile processors and so forth. Referring now to FIG. 4, shown is a block diagram of a processor in accordance with an embodiment of the present invention. As shown in FIG. 4, processor 400 may be a multicore processor including a plurality of cores 410a-410n. In one embodiment, each such core may be of an independent power domain and can be configured to enter and exit active states and/or turbo modes based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a frequency limit control logic 459 in accordance with an embodiment of the present invention. As described above, this logic acts to dynamically limit maximum operating frequencies to resolved values lower than maximum peak frequency values.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
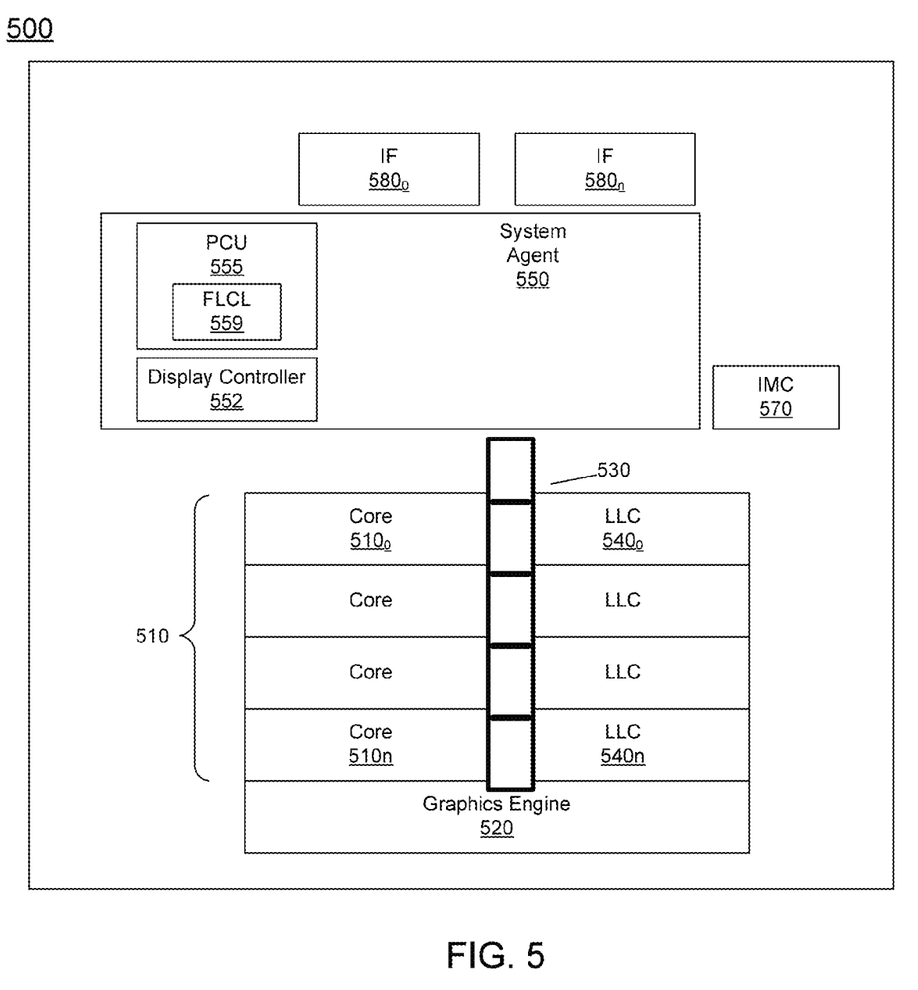
FIG. 5 is a block diagram of a processor in accordance with an embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a frequency limit control logic 559 in accordance with an embodiment of the present invention to enable configurable dynamic limiting of operating frequency as described herein. In various embodiments, this logic may be configured as in FIG. 2 and may execute the algorithm described above in FIG. 3.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 5, understand the scope of the present invention is not limited in this regard.

Figure 6:
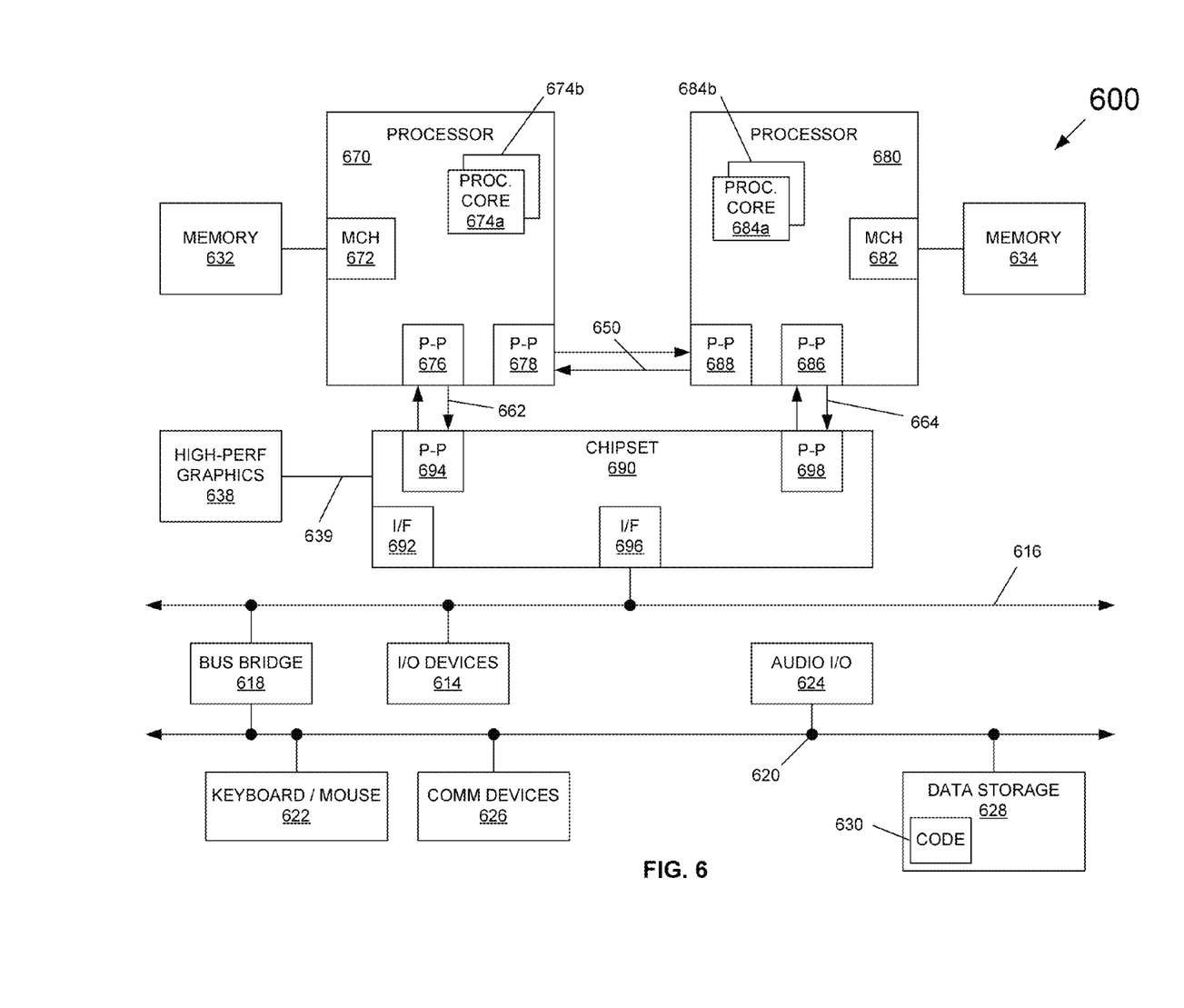
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform frequency limiting responsive to control of a software or other entity, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a first domain formed on a semiconductor die including a plurality of cores each to execute instructions;
    a second domain formed on the semiconductor die including at least one graphics engine to execute instructions;
    a non-volatile storage formed on the semiconductor die to store a plurality of maximum peak operating parameter values for an operating parameter, each of the maximum peak operating parameter values a function of a number of active cores of the processor;
    a storage formed on the semiconductor die to store a plurality of configurable clip parameter values for the operating parameter, based on a priori knowledge of a workload of an application to be executed on the processor, provided by a user;
    a configuration storage formed on the semiconductor die to store a plurality of parameter limits, each of the parameter limits corresponding to one of the maximum peak operating parameter values or a configurable clip parameter value less than the maximum peak operating parameter value obtained from the storage during runtime of the application to place a limit on an operating parameter, each of the non-volatile storage, the storage and the configuration storage comprising a different storage; and
    a power controller formed on the semiconductor die to place the limit on the operating parameter of at least one of the first domain and the second domain to a corresponding parameter limit obtained from the configuration storage, wherein the power controller is to store in the configuration storage a minimum of the corresponding maximum peak operating parameter value and the configurable clip parameter value, the configurable clip parameter value obtained from the user prior to execution of the workload, based on the a priori knowledge of the workload according to execution of the workload using the plurality of maximum peak operating parameter values to determine a failure surface.

2. The processor of claim 1, wherein the maximum peak operating parameter values each correspond to a frequency value, and the power controller is to store in the configuration storage a minimum of the corresponding maximum peak operating frequency value and a configurable clip frequency value corresponding to the configurable clip parameter value.

3. The processor of claim 2, wherein the power controller is to overwrite one of the maximum peak operating frequency values stored in the configuration storage with the configurable clip frequency value.

4. The processor of claim 2, wherein the power controller is to use the configurable clip frequency value to enable the processor to enter into a higher performance state, but to prevent the processor from reaching a constraint of the processor.

5. The processor of claim 2, wherein the power controller is to use the configurable clip frequency value to enable a plurality of processors of different systems to each execute the application in a deterministic manner.

6. The processor of claim 2, wherein the power controller is to select the operating parameter limit based on a number of active cores of the plurality of cores and prevent a first core from execution at a requested operating frequency when the requested operating frequency is greater than the selected parameter limit.

7. The processor of claim 1, wherein the power controller is to prevent execution of instructions at a rate higher than the configurable clip parameter value, wherein the configurable clip parameter value is a configurable clip instruction rate value.

8. A method comprising:
    receiving a set of configurable frequency limit values in a first logic of a multi-domain processor, and storing the set of configurable frequency limit values in a first storage, the set of configurable frequency limit values obtained from a user prior to execution of a workload, based on a priori knowledge of the workload according to execution of the workload using a set of maximum peak frequency values to determine a failure surface; and
    storing a corresponding minimum one of the set of configurable frequency limit values from the first storage or one of a set of maximum peak frequency values as a resolved value in each field of a configuration storage of the multi-domain processor, wherein the set of maximum peak frequency values are obtained from a non-volatile storage of the multi-domain processor and the set of configurable frequency limit values are stored into the first storage during runtime of the multi-domain processor to prevent the multi-domain processor from reaching a constraint during turbo mode operation, each of the first storage, the configuration storage and the non-volatile storage comprising a different storage.

9. The method of claim 8, further comprising:
receiving a performance request for a core domain of the multi-domain processor during the runtime and determining a number of active cores of the core domain; and
determining whether a field of the configuration storage corresponding to the number of active cores stores a resolved value less than an operating frequency associated with the performance request, and if so limiting the operating frequency for the core domain to the resolved value.

10. The method of claim 9, further comprising otherwise enabling the operating frequency to be at the operating frequency associated with the performance request.

11. The method of claim 8, further comprising receiving a performance request for a graphics domain of the multi-domain processor during the runtime and determining a number of active graphics processors of the graphics domain, and limiting an operating frequency for the graphics domain based at least in part on the number of active graphics processors.

12. The method of claim 8, further comprising overwriting one of the set of maximum peak frequency values stored in a first field of the configuration storage with a corresponding one of the set of configurable frequency limit values.

13. A system comprising:
a multicore processor including a plurality of cores, a non-volatile storage to store a plurality of maximum peak operating frequency values, each of the maximum peak operating frequency values a function of a given number of active cores, a limit storage to store a plurality of configurable clip frequency values, a power control unit (PCU), and a frequency limit control logic to store in each field of a configuration storage a corresponding minimum one of the maximum peak operating frequency values stored in the non-volatile storage or a configurable clip frequency value stored in the limit storage, the configurable clip frequency value based on a priori information regarding a workload to be executed on the multicore processor, provided by a user, the a priori information according to execution of the workload using the plurality of maximum peak operating frequency values to determine a failure surface, wherein each of the non-volatile storage, the limit storage and the configuration storage comprise a different storage of the multicore processor; and
a dynamic random access memory (DRAM) coupled to the multicore processor.

14. The system of claim 13, wherein the frequency limit control logic is to perform the storage responsive to execution of a first application on the multicore processor including the workload.

15. The system of claim 14, wherein a second system includes a second multicore processor, the second system and the system to execute the first application in a deterministic manner without reaching a constraint of the multicore processor and the second multicore processor.

16. The system of claim 13, wherein the frequency limit control logic is to overwrite one of the maximum peak operating frequency values stored in the configuration storage with the configurable clip frequency value.

17. The system of claim 13, wherein the PCU is to enable the processor to enter into a higher performance state, and the configurable clip frequency value stored in the configuration storage is to prevent the multicore processor from reaching a constraint during execution of the workload.

* * * * *